(12) United States Patent
Huang et al.

(10) Patent No.: US 9,704,067 B2
(45) Date of Patent: Jul. 11, 2017

(54) NON-VOLATILE COMPUTER-READABLE STORAGE MEDIA, SYSTEM AND METHOD FOR AUTOMATICALLY GENERATING IMAGE DESCRIPTION

(71) Applicant: National Yunlin University of Science and Technology, Yunlin (TW)

(72) Inventors: Chuen-Min Huang, Douliu (TW); Cheng-Yi Wu, Tainan (TW); Po-Hung Chen, Kaohsiung (TW)

(73) Assignee: National Yunlin University of Science and Technology, Douliou, Yunlin (TW)

( * ) Notice: Subject to any disclaimer, the term of this patent is extended or adjusted under 35 U.S.C. 154(b) by 0 days.

(21) Appl. No.: 15/178,119

(22) Filed: Jun. 9, 2016

(65) Prior Publication Data

US 2017/0046599 A1   Feb. 16, 2017

(30) Foreign Application Priority Data

Aug. 12, 2015   (TW) .............................. 104126301 A (51) Int. Cl.
G06K 9/62     (2006.01)
G06K 9/52     (2006.01)
G06F 17/27    (2006.01)

(52) U.S. Cl.
CPC ......... *G06K 9/6267* (2013.01); *G06F 17/277* (2013.01); *G06K 9/52* (2013.01)

(58) Field of Classification Search
None
See application file for complete search history.

(56) References Cited

U.S. PATENT DOCUMENTS

| | | | | |
|---|---|---|---|---|
| 9,189,514 B1* | 11/2015 | Myslinski | .......... | G06Q 30/0255 |
| 2004/0029085 A1* | 2/2004 | Hu | .......... | G06F 17/2745 434/178 |
| 2004/0117740 A1* | 6/2004 | Chen | .......... | 715/210 |
| 2006/0210157 A1* | 9/2006 | Agnihotri | .......... | G06F 17/30793 382/173 |
| 2011/0196670 A1* | 8/2011 | Dang | .......... | G06F 17/2785 704/9 |
| 2015/0317408 A1* | 11/2015 | Hong | .......... | G06F 17/30958 707/798 |

FOREIGN PATENT DOCUMENTS

| | | |
|---|---|---|
| TW | 200937228 A | 9/2009 |
| TW | 201332348 A | 8/2013 |
| TW | 201415252 A | 4/2014 |

* cited by examiner

*Primary Examiner* — Atiba O Fitzpatrick
(74) *Attorney, Agent, or Firm* — Muncy, Geissler, Olds & Lowe, P.C.

(57) ABSTRACT

A method for automatically generating an image description includes following steps of: obtaining a first image data; analyzing a text file corresponding to the first image data; calculating occurrences and distribution ratios of terms, each of which contains a target word, from the text file, so as to obtain a plurality of the terms having the distribution ratios greater than a threshold; comparing the distribution ratios of the terms so as to find out at least one key term; finding out one of a plurality of lexical chains containing the key term with a greatest distribution ratio so as to generate a narrative language chain; and setting the narrative language chain as a description of the first image data. A system for automatically generating an image description and a non-volatile computer-readable storage media are also disclosed.

8 Claims, 5 Drawing Sheets

Dark matter may not be completely dark

Scientists have found tantalising evidence suggesting dark matter may be more dynamic than thought.
For the first time dark matter may have been observed interacting with other dark matter in a way other than through the force of gravity, they report in the Monthly Notices of the Royal Astronomical Society (RAS).
Calculations based on the Standard Model of cosmology suggest dark matter accounts for nearly 85 percent of the mass in the Universe, stretching out in clumpy tendrils that enfold galaxies.
But until now, that was pretty much all we knew, says the study's lead author, Dr Richard Massey, an astrophysicist at Durham University.
"Everything that we've known about dark matter until now is that it sits around doing nothing, affects the Universe around it but doesn't do anything else," says Massey.
"We've found for the first time that it may have more tricks up its sleeve -- it might be affecting things around it in other ways, through other forces."
The evidence comes from a unique chance, using the US Hubble orbital telescope and the European Southern Observatory's Very Large Telescope in Chile.
Together, the two high-powered facilities viewed the simultaneous collision of four distant galaxies at the centre of a galaxy cluster Abell 3827, which is located 1.3 billion light-years from Earth.
What grabbed the astronomers' attention was that one dark matter clump seemed to be lagging behind the galaxy it surrounds.
The gap was big -- 5000 light-years, or 50,000 million million kilometres.

NON-VOLATILE COMPUTER-READABLE STORAGE MEDIA, SYSTEM AND METHOD FOR AUTOMATICALLY GENERATING IMAGE DESCRIPTION

CROSS REFERENCE TO RELATED APPLICATIONS

This Non-provisional application claims priority under 35 U.S.C. §119(a) on Patent Application No(s). 104126301 filed in Taiwan, Republic of China on Aug. 12, 2015, the entire contents of which are hereby incorporated by reference.

BACKGROUND OF THE INVENTION

Field of Invention

The present invention relates to a non-volatile computer-readable storage media, and a system and a method for automatically generating an image description.

Related Art

In this modern age, it is a general thing to catch news from television, computer or mobile device. For example, the network news shown in the webpage usually contains a text article accompanying with the related picture(s) or images. The pictures or images can grab the reader's attention and help to easily realize this news.

However, if these pictures or images are not given with proper descriptions or illustrations, or the given descriptions or illustrations are simply identical to the title of the news, the reader can't rapidly understand the content of the news. Besides, these pictures or images may not catch the attention of the reader, which will lead to a low CRT (click through rate). In practice, the editor or author has to draft a plentiful "News" as well as a provocative and attracting "Headline", so it will be an extra complicated work to add proper descriptions or illustrations to a large amount of pictures. If the appropriate descriptions or illustrations are not added to the corresponding pictures or images, the purpose for catching the eyes of the reader or helping to rapidly realize the news can be failed.

SUMMARY OF THE INVENTION

In view of the foregoing, the present invention is to provide a non-volatile computer-readable storage media, and a system and a method for automatically generating an image description that can rapidly and simply find out the appropriate descriptions or illustrations for the pictures or images, thereby saving the time for adding the descriptions or illustrations to the pictures or images, and thus achieving the purpose for catching the eyes of the reader or helping to rapidly realize the news.

To achieve the above, the present invention discloses a method for automatically generating an image description including the following steps of: obtaining a first image data; analyzing a text file corresponding to the first image data; calculating occurrences and distribution ratios of terms, each of which contains a target word, from the text file, so as to obtain a plurality of the terms having the distribution ratios greater than a threshold; comparing the distribution ratios of the terms so as to find out at least one key term; finding out one of a plurality of lexical chains containing the key term with a greatest distribution ratio so as to generate a narrative language chain; and setting the narrative language chain as a description of the first image data.

In addition, the present invention also discloses a system for automatically generating an image description, which includes an interface unit and an analyzing unit. The interface unit receives an operation of a user. The analyzing unit obtains a first image data and a corresponding text file according to the operation of the user. In addition, the analyzing unit analyzes the text file to find out a key term and then finds out a narrative language chain according to the key term.

In one embodiment, the distribution ratio of the term is a frequency of the term shown in the text file.

In one embodiment, the key term is retrieved according to a term linking intensity in the text file.

In one embodiment, the narrative language chain is one of the lexical chains, which has the highest correlation with the key term.

In one embodiment, the method further includes a step of: searching internet to find out a second image data correlating to the text file, the first image data or the narrative language chain.

In one embodiment, the text file and the first image data are obtained from a network address or inputted by a user.

In one embodiment, the analyzing unit further calculates occurrences and distribution ratios of terms, each of which contains a target word, from the text file so as to obtain a plurality of the terms having the distribution ratios greater than a threshold, compares the distribution ratios of the terms so as to find out at least a key term, and finds out one of a plurality of lexical chains containing the key term with the greatest distribution ratio so as to generate the narrative language chain.

In one embodiment, the system for automatically generating an image description further includes a storing unit for storing the text file and the first image data.

In one embodiment, the storing unit is a memory of an electronic device or a cloud device.

In one embodiment, the interface unit receives a network address, which is inputted by the user, so as to obtain the text file and the first image data.

In one embodiment, the user directly inputs the text file and the first image data through the interface unit.

In one embodiment, the system for automatically generating an image description further includes a searching unit for searching internet to find out a second image data correlating to the text file, the first image data or the narrative language chain.

The present invention further discloses a non-volatile computer-readable storage media, which stores an application program, and the application program is executed to perform following steps of: providing an operation interface for a user to operate; obtaining a first image data and a corresponding text file based on an operation of the user; analyzing the text file and calculating occurrences and distribution ratios of terms, each of which contains a target word, from the text file so as to obtain a plurality of the terms having the distribution ratios greater than a threshold; comparing the distribution ratios of the terms so as to find out at least a key term; finding out one of a plurality of lexical chains containing the key term with the greatest distribution ratio so as to generate a narrative language chain; and displaying the narrative language chain.

In one embodiment, the application program is further executed to perform following steps of: searching internet to find out a second image data correlating to the text file, the first image data or the narrative language chain; and displaying the second image data.

As mentioned above, the present invention is to analyze the text file corresponding to the first image data so as to obtain a plurality of terms having the distribution ratios greater than a threshold. Next, the distribution ratios of the terms are compared to find out at least a key term, and one of a plurality of lexical chains containing the key term with the greatest distribution ratio is selected so as to generate a narrative language chain. Then, the narrative language chain is set as a description of the first image data. Accordingly, the present invention can rapidly find out an image description or illustration for the first image data, thereby saving the time for adding the descriptions or illustrations to the first image data, and thus achieving the purpose for catching the eyes of the reader and helping to rapidly realize the article.

In addition, in one embodiment, the present invention can further search internet to find out a second image data correlating to the text file, the first image data or the narrative language chain, and the narrative language chain can also be set as the description or illustration of the second image data.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
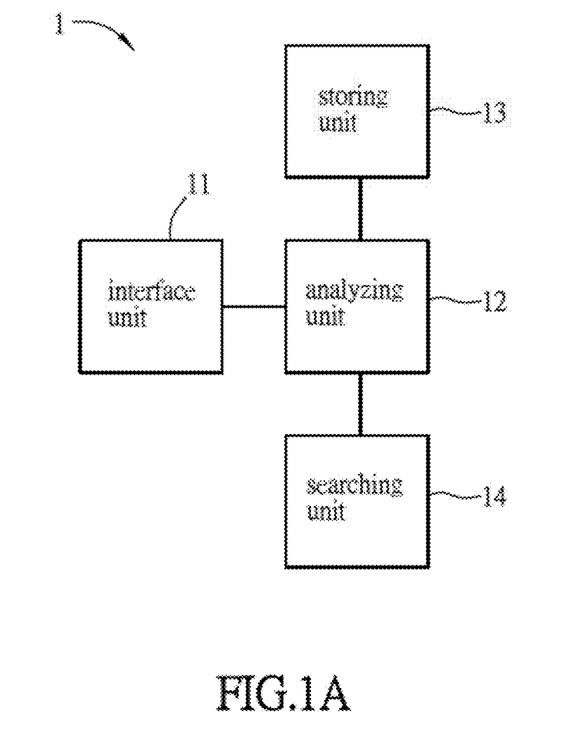
FIG. 1A is a functional block diagram showing a system for automatically generating an image description according to a preferred embodiment of the invention.
Figure 1B:
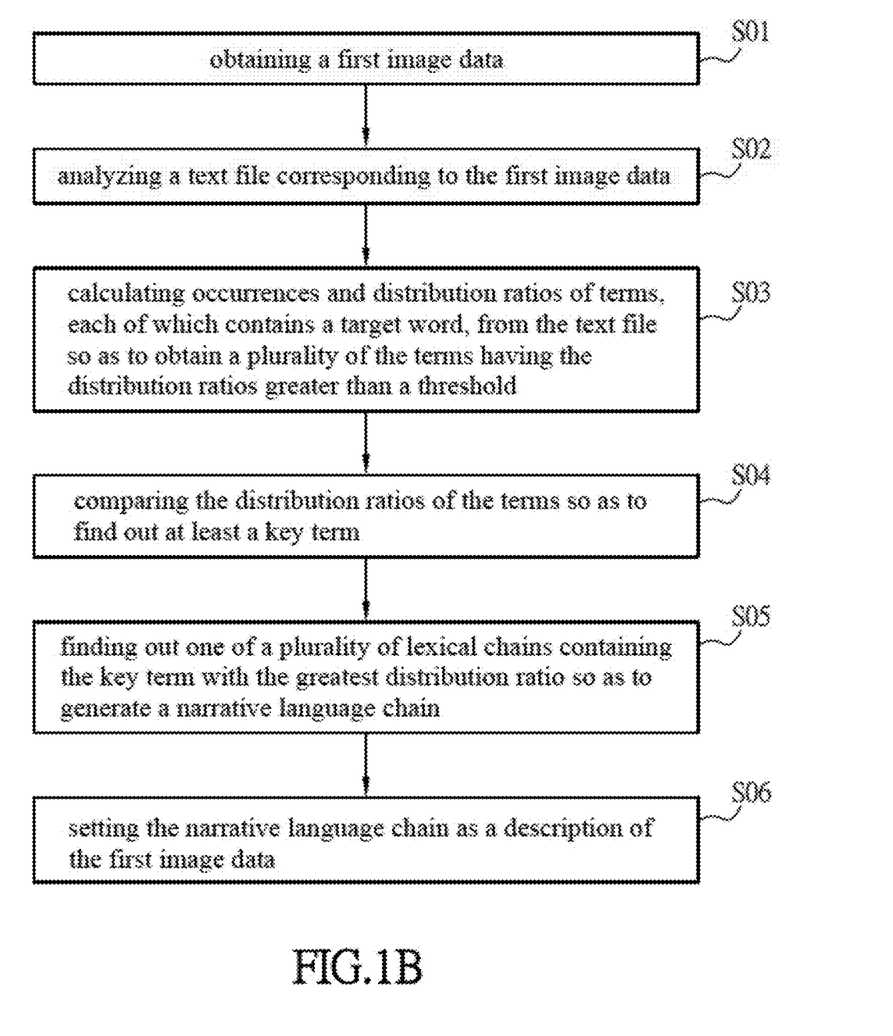
FIG. 1B is a flowchart of a method for automatically generating an image description according to a preferred embodiment of the invention.

FIG. 1A is a functional block diagram showing a system 1 for automatically generating an image description according to a preferred embodiment of the invention, and FIG. 1B is a flowchart of a method for automatically generating an image description according to a preferred embodiment of the invention.

As shown in FIG. 1A, the system 1 for automatically generating an image description includes an interface unit 11 and an analyzing unit 12. In addition, the system 1 for generating an image description may further include a storing unit 13 and a searching unit 14. To be noted, the functional blocks in FIG. 1A can be carried out by hardware (e.g. calculators, chips, computers, mobile devices, CPU, etc.), software or firmware, and this invention is not limited.

The interface unit 11 receives an operation of a user. The analyzing unit 12 obtains a first image data and a corresponding text file according to the operation of the user. In one embodiment, the interface unit 11 is a webpage browser, such as Chrome, Firefox, Safari, IE or the likes. Of course, in other embodiments, the interface unit 11 may be a plug-in component or add-ons, which is loaded on the webpage server. As mentioned above "a first image data and a corresponding text file", the first image data and the text file are correlated with each other. For example, the text file includes a "Headline" and a "Content" (e.g. a news), and the first image data is a picture or photo (e.g. news photo) correlated with the text file. After obtaining the first image data and the corresponding text file according to the operation of the user, the analyzing unit 12 analyzes the text file to find out an appropriate description for the first image data.

The storing unit 13 stores the text file and the first image data. In this case, the storing unit 13 is a memory of an electronic device (e.g. a computer) or a cloud device, and this invention is not limited. The searching unit 14 searches internet to find out a second image data correlating to the text file or the first image data. The detailed descriptions thereof will be illustrated hereinafter.

Figure 3:
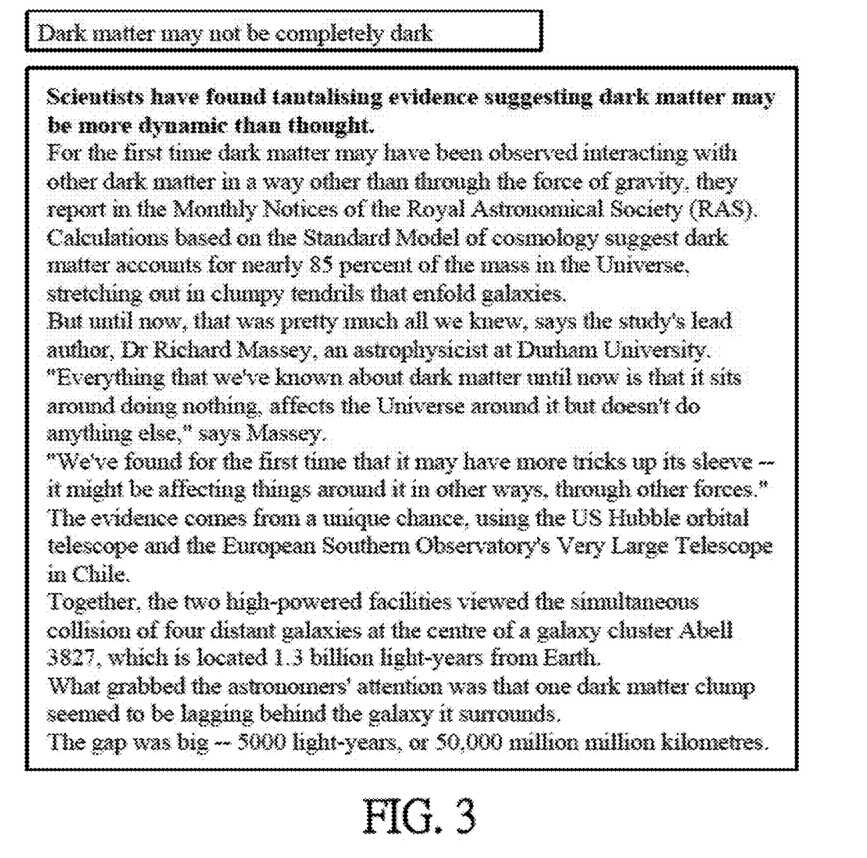
FIG. 3 is a schematic diagram showing an example of a text file.
Figure 4:
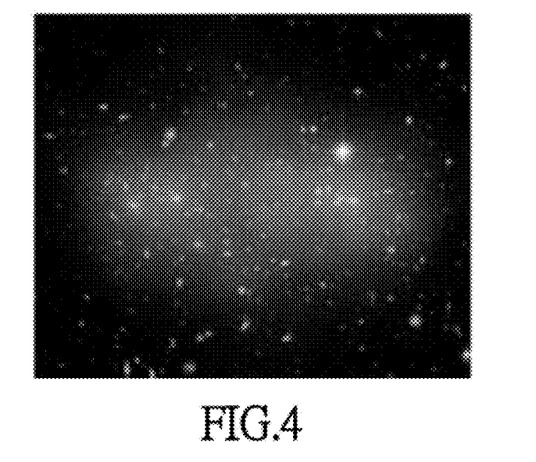
FIG. 4 is a schematic diagram showing a first image data corresponding to the text file of FIG. 3.

FIG. 3 is a schematic diagram showing an example of a text file, and FIG. 4 is a schematic diagram showing a first image data corresponding to the text file of FIG. 3. As shown in FIG. 3, the text file includes a news headline and a news content. To be noted, the following description is not taking the text file and image data of FIGS. 3 and 4 as an example, but only for an illustration of what is the text file stored in the storing unit 13 and what is the first image data stored in the storing unit 13.

The method for automatically generating an image description of the invention will be described hereinafter with reference to FIGS. 1A and 1B. As shown in FIG. 1B, the method for automatically generating an image description at least includes the following steps S01 to S06.

The step S01 is to obtain a first image data, and the step S02 is to analyze a text file corresponding to the first image data. As mentioned above, after obtaining the first image data and the corresponding text file, the interface unit 11 obtains a first image data and a corresponding text file according to the operation of the user. Then, the analyzing unit 12 analyzes the content of the text file. In this case, the text file and the first image data can be obtained from a network address or inputted (uploaded) by a user. In one embodiment, the interface unit 11 is a webpage browser, which displays at least one of the following two modes, including a "network address" mode and a "upload" mode, for receiving the text file and the first image data provided by the user.

For example, after selecting the "network address" mode, the user can directly input a network address containing the first image data and the corresponding text file (e.g. the address of YAHOO news) through the interface unit 11, thereby obtaining the desired first image data (picture files) and the corresponding text file (including the news headline and content). Alternatively, after selecting the "upload" mode, the user can directly key in the following words "news headline" and "news content" and then upload the picture file corresponding to the news content. Accordingly, the analyzing unit 12 can obtain the text file and the first image data based on the operation of the user. As mentioned above, the text files containing the "news headline" and the "news content" (see FIG. 3) and the corresponding first image data (see FIG. 4) can be obtained through the interface unit 11, and the text files and the first image data are then stored in the storing unit 13.

Next, the step S03 is to calculate occurrences and distribution ratios of terms, each of which contains a target word, from the text file, so as to obtain a plurality of the terms having distribution ratios greater than a threshold. In this step, the terms having distribution ratios greater than a threshold are retrieved according to a term linking intensity in the text file. That is, the terms with higher term linking intensity (appearance frequency is higher) in the text file are retrieved. In addition, the distribution ratio of the term means that the appearance frequency of the term in the text file. If the appearance number of one term is larger, the distribution ratio thereof is higher. Herein, the distribution ratio can be defined as: the distribution ratio of a specific following word is equal to the appearance number of the specific following word showing next to a certain word (target word) divided by the appearance number of all following words showing next to the certain word. Otherwise, the distribution ratio can also be defined as: the distribution ratio of a specific previous word is equal to the appearance number of the specific previous word showing in front of a certain word (target word) divided by the appearance number of all previous words showing in front of the certain word. For example, the entire text file includes four times of "my pet", two times of "my family", three times of "my house", and one time of "my name". Then, the distribution ratio of "my pet" is 0.4 (4/10), the distribution ratio of "my family" is 0.2 (2/10), the distribution ratio of "my house" is 0.3 (3/10), and the distribution ratio of "my name" is 0.1 (1/10).

After obtaining the occurrences and distribution ratios of terms, the distribution ratios are compared with a threshold, which is set by the user. When the distribution ratio of a term is greater than the threshold, the term is selected; otherwise, when the distribution ratio of a term is smaller than the threshold, the term is not selected. In the above example, if the threshold is set as 0.2, only the terms "my pet" and "my house" are selected. This selection result means that these two selected terms have higher occurrences and frequencies in the text file (wherein, the more important terms may appear more times in the text file). Afterwards, the step S03 is repeated to analyze the additional words shown in front of or next to these two terms "my pet" and "my house" so as to obtain the distribution ratios of the additional words, which are compared with the threshold later to obtain the terms or sentences having the distribution ratios larger than the threshold. Next, the above step is performed again to analyze other target words to obtain other terms containing other target words and having the distribution ratios larger than the threshold. After analyzing all words in the text file, calculating the corresponding distribution ratios, and comparing the corresponding distribution ratios with the threshold, the terms with the distribution ratios larger than the threshold can be all found out. Herein, the terms can be simple terms, complex terms, sentences, or paragraphs, and this invention is not limited.

Then, the step S04 is to comparing the distribution ratios of the terms so as to find out at least one key term. Herein, the analyzing unit 12 compares the distribution ratios of the terms, which are found out in the step S03, so as to find out at least one key term, and then to find out a narrative language chain according to the key term. Herein, the key term is also retrieved according to a term linking intensity in the text file. That is, the term of the most frequently appearance in the text file is defined as the key term. In other words, the key term is one of the obtained terms with the highest distribution ratio. Herein, the term of the most frequently appearance in the text file has the highest term linking intensity and thus is named as a first key term. In addition, the term with the second high distribution ratio is named as a second key term, the term with the third high distribution ratio is named as a third key term, and so on. Of course, the key term can be a simple term, a complex term, a sentence, or a paragraph.

After finding out the key term, the step S05 is to find out one of a plurality of lexical chains containing the key term with the greatest distribution ratio so as to generate a narrative language chain. In this embodiment, the analyzing unit 12 finds out a plurality of lexical chains, which are composed of the key term and other cooperated terms, from the text file. Herein, the lexical chain with the greatest distribution ratio is defined as the lexical chain that most frequently appears in the text file. This means that the lexical chain as well as the contained key term is most frequently appeared in the text file, and has the highest weight. In this case, the lexical chain can be a simple sentence, a sentences, a paragraph, or two or more paragraphs, and this invention is not limited. Accordingly, the analyzing unit 12 find out the frequently appearing one of a plurality of lexical chains containing the key term, and takes the selected lexical chain as a narrative language chain. In other words, the narrative language chain is composed of the lexical chain containing the key term and the combined words with the highest correlations.

Finally, the step S06 is to set the narrative language chain as a description (or a major description) of the first image data. In this embodiment, the analyzing unit 12 sets the generated narrative language chain, which is the most frequent lexical chain and is possible the most important description, as the major description of the first image data. Then, the major description, which is the most recommended description, is displayed to the user through the webpage browser. In one embodiment, except the narrative language chain (the most recommended description), the analyzing unit 12 can also find out the lexical chain with the second high or third high distribution for additional narrative language chains. These additional narrative language chains can be used as the additional recommended descriptions (the reference descriptions) of the first image data. Accordingly, the analyzing unit 12 is capable of providing a first recommended description, a second recommended description, a third recommended description, a fourth recommended description, and so on, to the user (e.g. a news editor).

In the case as shown in FIGS. 3 and 4, after the steps S01 to S06, the first recommended description of the text file is "one dark matter clump seemed to be lagging behind the galaxy it surrounds", the second recommended description of the text file is "But until now, that was pretty much all we knew", and the third recommended description of the text file is "Dark matter may not be completely dark". Accordingly, the editor can easily select one of the above provided recommended descriptions provided by the system 1 and set it as the description of the first image data. In practice, the editor can select any one of the first, second and third recommended descriptions. In other words, the editor does not have to spend time in drafting the description of the image.

Figure 2:
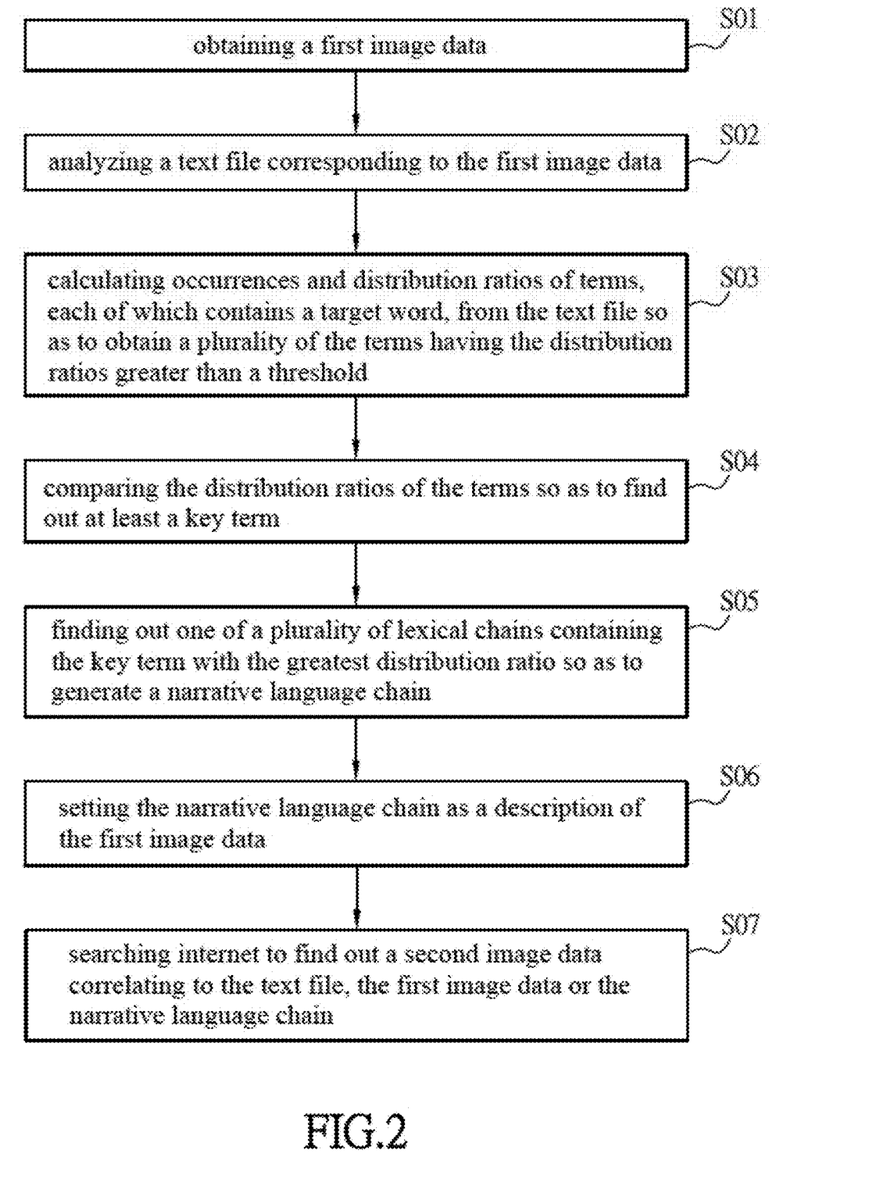
FIG. 2 is a flowchart of another method for automatically generating an image description according to the preferred embodiment of the invention.

FIG. 2 is a flowchart of another method for automatically generating an image description according to the preferred embodiment of the invention.

As shown in FIG. 2, the method for automatically generating an image description further includes a step S07, which is to search internet to find out a second image data correlating to the text file, the first image data or the narrative language chain. Herein, the second image data correlating to the text file, the first image data or the narrative language chain means that the description of the second image data is similar to the key term or the narrative language chain, or the content of the second image data is similar to that of the first image data.

Figure 5:
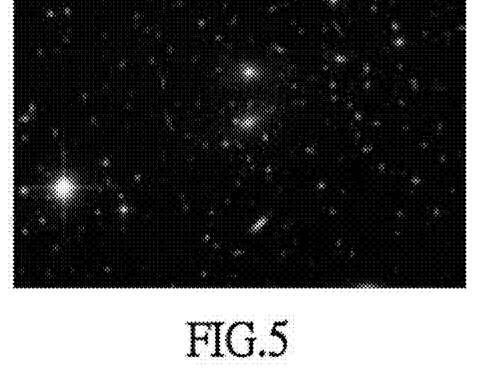
FIGS. 5 to 7 are schematic diagrams showing different second image data.
Figure 6:
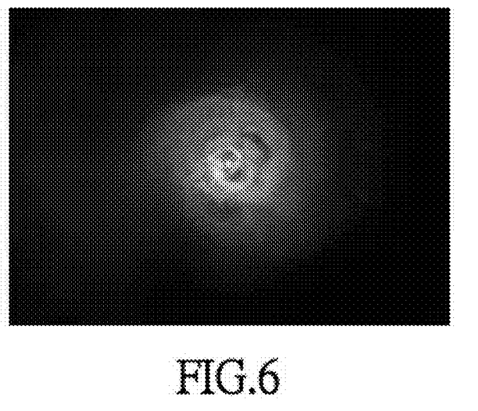
Figure 7:
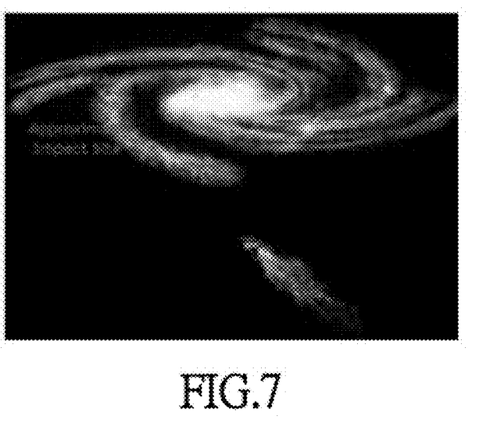

With reference to FIGS. 3 and 4, if the user (the editor) thinks that the first image data is improper or insufficient, he/she can use a searching unit 14 to search internet (use the key term or other terms in the text file for searching key words) to find out at least one second image data correlating to the text file, the first image data or the narrative language chain. Then, the interface unit 11 displays the searched second image data. FIGS. 5 to 7 are schematic diagrams showing different second image data, which are correlating to the text file, the first image data or the narrative language chain. In this case, the editor can further set the above first, second and third recommended descriptions as the descriptions or illustrations of the second image data.

To be noted, the system and method for automatically generating an image description of the invention is not limited to the application of the image of network news or newspaper. In other embodiments, the user can provide any text file and corresponding image data to the interface unit 11, and then the system and method of the invention can automatically generate a preferred description or illustration for the image data to the user.

Referring to FIG. 1A, the storing unit 13 may further store at least one application software. In this embodiment, the application software is an APP, or is capable of being executed by a computer. The storing unit 13 can be a memory of an electronic device (e.g. a computer), such as a non-transitory computer readable storage medium, for storing the application software. In this embodiment, the non-transitory computer readable storage medium (the storing unit 13) can be a memory module, a memory card, a CD, a tape or any of their combinations. The memory module can be ROM, RAM, flash memory module, FPGA memory module, or any other type of memory module, and this invention is not limited. Of course, in another embodiment, the storing unit 13 can be a cloud device, so that the application software can be stored in the cloud device.

The application software has the functions of the interface unit 11, the analyzing unit 12, the storing unit 13 and the searching unit 14 of the system 1 for automatically generating an image description, and it is executed by a computer to perform the following steps of: providing an operation interface for a user to operate; obtaining a first image data and a corresponding text file based on an operation of the user; analyzing the text file and calculating occurrences and distribution ratios of terms, each of which contains a target word, from the text file so as to obtain a plurality of the terms having the distribution ratios greater than a threshold; comparing the distribution ratios of the terms so as to find out at least a key term; finding out one of a plurality of lexical chains containing the key term with the greatest distribution ratio so as to generate a narrative language chain; and displaying the narrative language chain.

In addition, the application software can be executed by a computer to further perform the following steps of: searching internet to find out a second image data correlating to the text file, the first image data or the narrative language chain; and displaying the second image data. The other functions of the application software have been described in the above system 1 and method for automatically generating an image description of the previous embodiments, so the details thereof will be omitted.

In summary, the present invention is to analyze the text file corresponding to the first image data so as to obtain a plurality of terms having the distribution ratios greater than a threshold. Next, the distribution ratios of the terms are compared to find out at least a key term, and one of a plurality of lexical chains containing the key term with the greatest distribution ratio is selected so as to generate a narrative language chain. Then, the narrative language chain is set as a description of the first image data. Accordingly, the present invention can rapidly find out an image description or illustration for the first image data, thereby saving the time for adding the descriptions or illustrations to the first image data, and thus achieving the purpose for catching the eyes of the reader and helping to rapidly realize the article.

In addition, in one embodiment, the present invention can further search internet to find out a second image data correlating to the text file, the first image data or the narrative language chain, and the narrative language chain can also be set as the description or illustration of the second image data.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method for automatically generating an image description, comprising following steps of:
   obtaining a first image data;
   analyzing a text file corresponding to the first image data;
   calculating occurrences and distribution ratios of terms, each of which contains a target word, from the text file so as to obtain a plurality of the terms having the distribution ratios greater than a threshold;
   comparing the distribution ratios of the terms so as to find out at least a key term;
   finding out one of a plurality of lexical chains containing the key term with the greatest distribution ratio so as to generate a narrative language chain; and
   setting the narrative language chain as a description of the first image data.

2. The method according to claim 1, wherein the distribution ratio of the term is a frequency of the term shown in the text file.

3. The method according to claim 1, wherein the key term is retrieved according to a term linking intensity in the text file, and the term with the highest frequency shown in the text file is defined as the key term.

4. The method according to claim 1, wherein the narrative language chain is one of the lexical chains, which has the highest correlation with the key term.

5. The method according to claim 1, further comprising a step of:
   searching internet to find out a second image data correlating to the text file, the first image data or the narrative language chain.

6. The method according to claim 1, wherein the text file and the first image data are obtained from a network address or inputted by a user.

7. A non-volatile computer-readable storage media storing an application program, wherein a computer loads and executes the application program to perform following steps of:
   providing an operation interface for a user to operate;
   obtaining a first image data and a corresponding text file based on an operation of the user;
   analyzing the text file and calculating occurrences and distribution ratios of terms, each of which contains a target word, from the text file so as to obtain a plurality of the terms having the distribution ratios greater than a threshold;

comparing the distribution ratios of the terms so as to find out at least a key term;

finding out one of a plurality of lexical chains containing the key term with the greatest distribution ratio so as to generate a narrative language chain; and displaying the narrative language chain.

8. The non-volatile computer-readable storage media according to claim 7, wherein the computer loads and executes the application program to perform following steps of:

searching internet to find out a second image data correlating to the text file, the first image data or the narrative language chain; and displaying the second image data.

* * * * *